United States Patent
Smith et al.

(10) Patent No.: US 8,259,948 B2
(45) Date of Patent: Sep. 4, 2012

(54) VIRTUAL TPM KEY MIGRATION USING HARDWARE KEYS

(75) Inventors: Ned M. Smith, Beaverton, OR (US);
Willard M. Wiseman, Tigard, OR (US);
Alok Kumar, Fremont, CA (US);
Tasneem Brutch, Cornelius, OR (US);
Vincent Scarlata, Beaverton, OR (US);
Faraz A. Siddiqi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1058 days.

(21) Appl. No.: 11/967,143

(22) Filed: Dec. 29, 2007

(65) Prior Publication Data

US 2009/0169012 A1     Jul. 2, 2009

(51) Int. Cl.
*H04L 9/06* (2006.01)
*H04L 9/00* (2006.01)
*H04L 9/08* (2006.01)
*H04L 9/14* (2006.01)
*H04L 9/30* (2006.01)

(52) U.S. Cl. ........ 380/277; 380/278; 380/279; 380/281; 380/282

(58) Field of Classification Search .............. 380/277, 380/278, 379, 281, 282, 45, 279
See application file for complete search history.

(56) References Cited

U.S. PATENT DOCUMENTS

| | | | | |
|---|---|---|---|---|
| 5,444,701 A * | 8/1995 | Cypher et al. | ................ | 370/406 |
| 5,564,037 A * | 10/1996 | Lam | ................ | 711/161 |
| 8,074,262 B2 | 12/2011 | Scarlata | | |
| 2002/0059286 A1 * | 5/2002 | Challener | ................ | 707/100 |
| 2005/0091661 A1 | 4/2005 | Kurien et al. | | |
| 2005/0246552 A1 * | 11/2005 | Bade et al. | ................ | 713/193 |
| 2006/0020781 A1 | 1/2006 | Scarlata et al. | | |
| 2006/0088167 A1 * | 4/2006 | Bade et al. | ................ | 380/281 |
| 2006/0248038 A1 * | 11/2006 | Kaplan et al. | ................ | 707/1 |
| 2006/0256105 A1 | 11/2006 | Scarlata et al. | | |
| 2006/0256106 A1 | 11/2006 | Scarlata et al. | | |
| 2006/0256107 A1 | 11/2006 | Scarlata et al. | | |
| 2006/0256108 A1 * | 11/2006 | Scaralata | ................ | 345/418 |
| 2007/0016801 A1 | 1/2007 | Bade et al. | | |
| 2007/0043680 A1 * | 2/2007 | Fox et al. | ................ | 705/59 |

(Continued)

OTHER PUBLICATIONS

Virtual monotonic counters and count-limited objects using a TPM without a trusted OS Luis F. G. Sarmenta, Marten van Dijk, Charles W. O'Donnell, Jonathan Rhodes, Srinivas Devadas Nov. 2006 STC '06: Proceedings of the first ACM workshop on Scalable trusted computing. Publisher: ACM. pp. 27-41.*

(Continued)

*Primary Examiner* — Kambiz Zand
*Assistant Examiner* — Aubrey Wyszynski
(74) *Attorney, Agent, or Firm* — Trop, Pruner & Hu, P.C.

(57) ABSTRACT

The present subject matter is related to trusted computing, and more particularly to migration of virtual trusted platform module keys that are rooted in a hardware trusted platform module. Some embodiments include a trusted platform virtualization module that may perform one or more of inbound and outbound trusted platform module key migrations. Such migrations may be performed between a virtual trusted platform module and either a hardware or a virtual trusted platform module.

22 Claims, 6 Drawing Sheets

U.S. PATENT DOCUMENTS

| | | | |
|---|---|---|---|
| 2007/0094719 A1 | 4/2007 | Scarlata | |
| 2007/0300069 A1* | 12/2007 | Rozas | 713/176 |
| 2008/0059799 A1 | 3/2008 | Scarlata | |
| 2008/0163209 A1 | 7/2008 | Rozas et al. | |
| 2008/0244569 A1 | 10/2008 | Challener et al. | |
| 2008/0282348 A1* | 11/2008 | Proudler et al. | 726/22 |
| 2009/0086979 A1* | 4/2009 | Brutch et al. | 380/279 |
| 2009/0089582 A1 | 4/2009 | Brutch et al. | |
| 2009/0154709 A1* | 6/2009 | Ellison | 380/282 |
| 2009/0169012 A1 | 7/2009 | Smith et al. | |
| 2010/0023755 A1* | 1/2010 | Kotani et al. | 713/156 |

OTHER PUBLICATIONS

U.S. Patent and Trademark Office, Office Action mailed Sep. 14, 2010 and Reply filed Dec. 9, 2010 in U.S. Appl. No. 11/864,512.

U.S. Patent and Trademark Office, Final Office Action mailed Feb. 14, 2011 and Request for Continued Examination filed May 12, 2011 in U.S. Appl. No. 11/864,512.

U.S. Patent and Trademark Office, Office Action mailed Aug. 17, 2011 and Reply filed Nov. 17, 2011 in U.S. Appl. No. 11/864,512.

U.S. Patent and Trademark Office, Final Office Action mailed Feb. 2, 2012 and Reply filed Apr. 2, 2012 in U.S. Appl. No. 11/864,512.

* cited by examiner

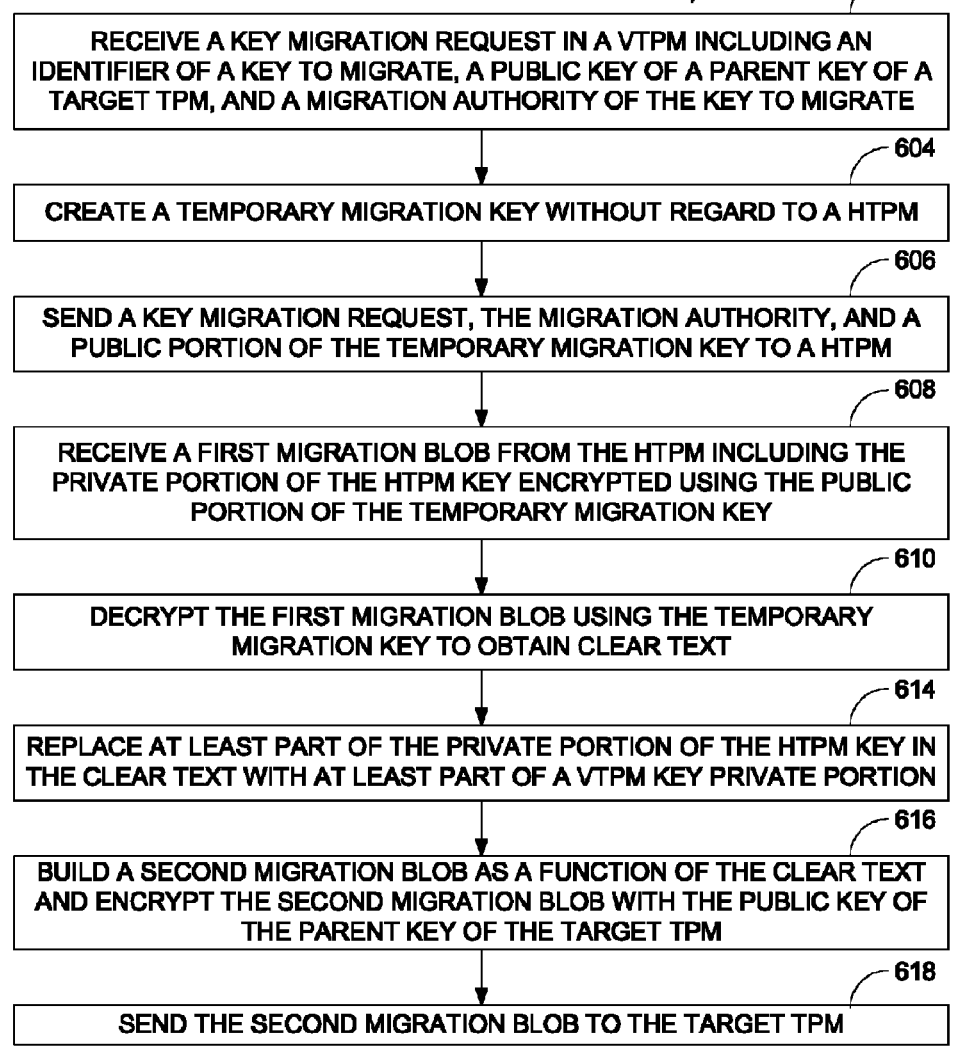

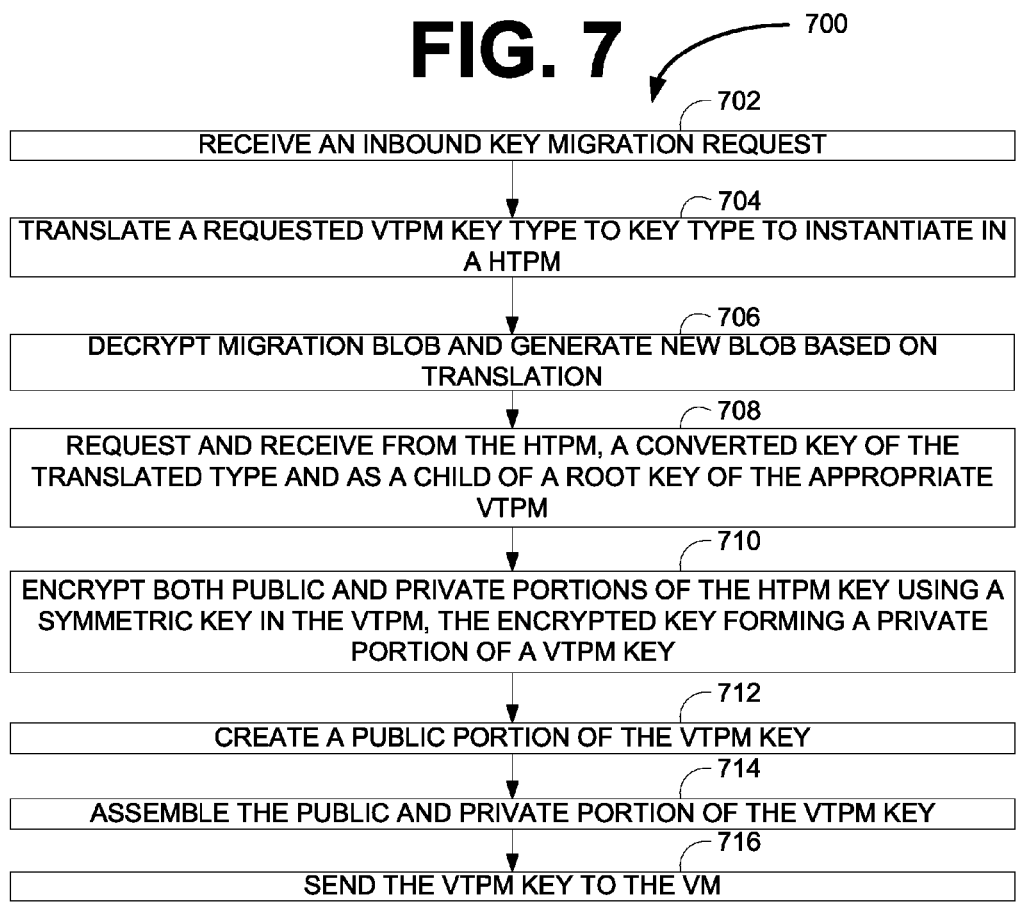

VIRTUAL TPM KEY MIGRATION USING HARDWARE KEYS

BACKGROUND INFORMATION

A trusted platform module ("TPM") generally is a microcontroller that can store secure information within a computer system or device built into a chipset. A TPM offers facilities for generation of cryptographic keys, the ability to limit the use of keys, as well as a random number generator. The keys may include keys such as an Endorsement Key or a Storage Root Key that allow secure access to the computer system to minimize risks of losing or compromising important information from hacking, viruses, worms, and the like.

The purpose of a TPM is to keep sensitive information out of memory and the control of software. When a virtual machine monitor, such as a hypervisor is implemented on a computing device, the TPM needs to be virtualized to allow each virtual machine access to it. However, this typically brings the sensitive information of the TPM into general purpose system memory and under the control of software.

BRIEF DESCRIPTION OF THE DRAWINGS

FIG. 6 is a block diagram of a method according to an example embodiment.

FIG. 7 is a block diagram of a method according to an example embodiment.

DETAILED DESCRIPTION

Figure 1:
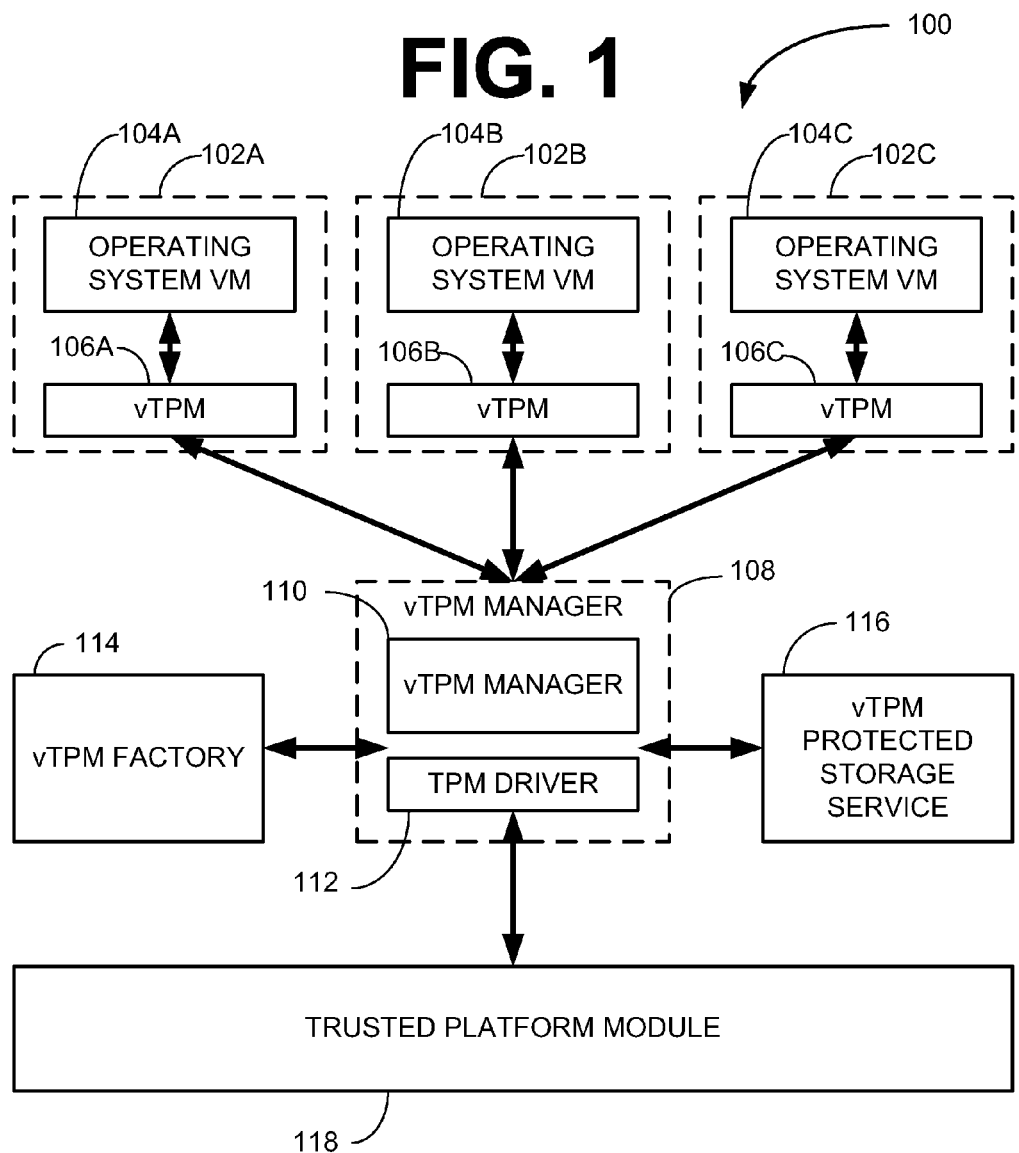
FIG. 1 is an architectural diagram of a system according to an example embodiment.

Various embodiments herein typically include a hardware Trusted Platform Module ("TPM"), CPU, memory, firmware I/O interfaces. Operating on such hardware is software including a virtual machine manager ("VMM") and one or more user virtual machines ("VM"), one or more of which may be service virtual machines. In some embodiments, one or more service virtual machines includes software needed to implement TPM functionality and to manage virtualized TPM context structures. In other embodiments, software needed to implement TPM functionality and to manage virtualized TPM context structures is part of the VMM.

In some embodiments, a virtual TPM context includes a TPM state specific context for each VM environment such that no two VMs need to coordinate state changes. In such embodiments, the keys specific to each virtual TPM ("vTPM") context are independent of any other vTPM context, yet all of the vTPM keys are generated by the hardware TPM ("hTPM") and benefit from hTPM hardening and key management capabilities. In some embodiments, the VMs stored the vTPM keys specific to their own contexts. However in some other embodiments, vTPM keys may be stored using the hTPM but the key hierarchy of the vTPM typically is rooted in the hTPM to provide increased assurance that the key hierarchies of each vTPM have the same security as well as key migration properties as if each VM has a dedicated hTPM. In yet other embodiments, vTPM keys may be stored in a partition of memory accessible only by a limited number of processes, such as specific VMs or a VMM.

The PCR registers include software measurements of an environment from which processes authorized to access TPM keys exist. If a process outside of an authorized environment attempts to access a TPM key, the TPM prevents the access. For example, if a TPM, such as a hTPM includes PCR entries tying the hTPM to a first VM, attempts by a second VM to access keys of the hTPM, the second VM will not be permitted to access the hTPM keys.

Maintaining equivalent security properties in a vTPM as in a hTPM typically includes protection of virtualized platform configuration registers (PCRs) using protections provided by platform hardware and the VMM software. In order to ensure that vPCRs are enforced on keys, the keys may be double wrapped. For example, one key of a vTPM may be instantiated as a hTPM key resulting in a wrapped key, which may include PCRs embedded within in being outputted by the TPM. This key may be wrapped again embedding the vPCRs in the key. The vTPM key ensures that only an authorized virtual machine configuration may access the key, while the hTPM ensures that only the correct platform configuration may access the key. In such embodiments, if the vTPM key is a TPM "Legacy" key, then the vTPM has greater flexibility in using vTPM private keys from within the hTPM, which is required to support key migration.

Thus, in various embodiments, a service VM is granted access to the hTPM and the hTPM PCRs are tied to the service VM. The user VMs include their own PCR entries associated with respective vTPMs. Through use of the vTPM PCR entries and double wrapping of the vPCRs, the service VM is able to provide secure hTPM access.

In these embodiments, the vTPMs also allow for TPM keys to be migrated in from other TPMs, such as from hTPMs of other computing devices and vTPMs of an other VM or other computing device. TPM keys may also be migrated out of a vTPM other virtual and hardware TPMs. These and other embodiments are described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on non-transitory computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

TPM virtualization provides a unique set of challenges because the TPM was not designed to be virtualized. The TPM is a stateful device, which is required to store security sensitive measurements of a platform, and functionality that simplifies virtualization and context switching is currently not available. This complicates sharing if transparent virtualization is required.

For example, the TPM stores measurements of the operating system in the Platform Configuration Registers (PCRs). However, the PCRs cannot be reset or swapped during runtime because that would allow an untrustworthy operating system to masquerade as a trustworthy operating system. In a Virtual Machine Monitor (VMM) context, this means the VMM needs to provide an alternative mechanism for storing measurements for VMs and provide a way to report and bind keys to these measurements.

Another challenge is that each TPM has a unique endorsement key which, when shared directly, has privacy concerns. Lastly, the monotonic counters are designed to be used by a single consumer who controls when they are incremented. If a counter is incremented by multiple contexts or applications, that expect to own a counter, could cause instability in some or all of those applications.

Since a TPM cannot be shared directly across many virtual machines, a software entity on the platform is required to provide some TPM functionality to the virtual machines, even though it may use an existing hardware TPM to facilitate this. The trustworthiness of this software entity is only as strong as the isolation that protects its secrets while it is operating. Strong isolation should be provided between different vTPMs to prevent a compromised vTPM from compromising other vTPMs. At the same time, migration of TPM keys in and out of a vTPM should be allowed.

Proper isolation ensures the protection of a vTPM while operational. However, an equally important property is to protect the vTPM when it is not operational. The framework should withstand modifications to the Trusted Computing Base (TCB), which includes all software, which must be trusted to ensure protection and isolation of the vTPM components. Additionally the framework should withstand tampering to any component of the vTPM framework, as well as any data stored on hard disks and similar persistent storage locations in support of the vTPM framework. Well-reviewed software can achieve high assurance in some areas; however software alone is unable to achieve this level of off-line protection on open PC platforms. For example, protection mechanisms implemented in the VMM do not protect secrets when an attacker boots the system on an entirely different and untrusted VMM, which will leak secrets. Therefore it is necessary that the vTPM use the platform TPM's secure storage services, which can lock data down to the trusted software configuration. At the same time it is also necessary that a vTPM be able to migrate TPM keys in and out of the vTPM regardless of whether the source or destination of such a migration is a hTPM or a vTPM.

The industry consortium Trusted Computing Group ("TCG") has standardized the Trusted Platform Modules as a small cryptographic subsystem, which promises to provide a foundation for trust on a platform. The TPM's primary functions are to facilitate attestation and provide protected storage.

The core of the TPM's functionality lies in its ability to store information about the platform's configuration. This information can then be used for both of the TPM's main goals. The platform can provide information to a remote entity necessary to allow it to make decisions about the trustworthiness of the platform. The platform can also instruct the TPM to ensure that keys or sensitive data are only released while the system is in a known authorized configuration.

In order to store the platform state, the TPM uses Platform Configuration Registers (PCRs) to store measurements similar to fingerprints, such as in the form of 160-bit SHA1 cryptographic hashes of software and configuration information for the platform. These measurements typically start at the boot block or CPU microcode. Each boot component measures the next component, records the measurement in the TPM, and then launches that component until the boot process starts the operating system. The operating system then takes over the measurement of its core. Because each write to PCRs adds a measurement to the register, rather than overwriting the previous measurement, no entity can change the measurement of its code made by the preceding component. Thus, a chain of measurements is made, such that if the beginning of the chain, known as the Root of Trust for Measurement, and each link are trusted, the entire chain is trusted.

Attestation in the context of a TPM refers to the set of TPM functions and protocols that enable the platform to report its configuration to a remote party in a trustworthy manner. In particular, the TPM provides the ability to sign the PCRs reflecting the current platform state using an Attestation Identity Key ("AIK") resulting in a Quote.

A credential system is used to provide proof to a remote entity that the Quote was signed by a real TPM. Each AIK has an Identity Credential in which a 3rd party asserts that the specified AIK is protected by a real TPM. Before making this assertion, the third party requires evidence that the AIK is in fact in a real TPM. To facilitate this, each TPM is created with an Endorsement Key ("EK"). An Endorsement Credential is created asserting that the Endorsement Key is in a real TPM. This credential is signed by either the TPM manufacturer, the platform OEM, or the IT department of an enterprise and serves as the base assertion that the EK is in a legitimate TPM. The TPM uses the EK along with its credential to convince the third party that the TPM's AIK's are real TPM AIK's. Since the EK uniquely identifies the TPM and cannot be changed, privacy concerns require that the EK only used to prove the legitimacy of AIKs. AIKs, which can be created and destroyed at will, are then used for attestation. Only this third party can relate AIKs to their corresponding EK, so the TCG refers to the 3rd party Certification Authority ("CA") called the Privacy CA, which is trusted to ensure the privacy of the TPM users.

If a Privacy CA trusts the Endorsement Credential signer and the root of trust for measurement, then the Privacy CA will issue an Identity credential. During an attestation, if the remote challenger trusts the Privacy CA that signed the Identity credential, then a Quote signed by an AIK, accompanied by that Identity Credential, is cryptographic evidence of the current state of the platform.

The third major set of services the TPM provides is secure storage of data and keys. The TPM can create RSA keys, which have password-based and PCR Binding-based access controls. PCR bindings specify the set of PCR values that indicate the platform state allowed to use the key. This allows a system running trusted software to ensure that only that trusted software may access data and keys it owns. This mechanism makes data inaccessible after an operating system compromise, a boot off external media, or an otherwise tampered with system.

In addition to supporting keys, the TPM also provides counters to aid in providing data freshness guarantees. The TPM's Monotonic Counters are persistent counters stored inside the TPM that can be incremented by their owner. These counter values can be embedded into encrypted data blobs to indicate whether that blob is the most recent blob saved and not a replay of old data off disk.

To provide Attestation and Secure Storage providing, the TPM creates keys with single-purpose types for different operations. The Endorsement Key is only available for decrypting Identity Credentials from the Privacy CA. Attestation Identity Keys are used to sign other keys and Quote PCRs. Storage Keys are used to protect other keys or Seal data, which is a special encryption of data that protects them with a password or PCR bindings. Binding keys are used to encrypt. Signing keys are used for signing arbitrary data. Lastly, Legacy keys can sign or encrypt data and are not limited to TCG structured data.

Each TPM has two core keys, an Endorsement Key and a Storage Root Key (SRK). The SRK is the top of the hierarchy of keys that can be created by the system or users. This hierarchy is built on Storage Keys as branches and any of the other types as leaves. Of the keys in the hierarchy, only the SRK and EK are required to be loaded in the TPM at all times. Other keys are stored outside the TPM encrypted as a "wrapped key" and loaded prior to use. Once a key is loaded, the TPM decrypts the key, after which it can perform any functions, provided the key type is correct for the operation, proper authorization is given, and the PCRs match any PCR binding specified by the key. The various embodiments herein further utilize a double wrapping method to put another wrapper on wrapped TPM keys. Such double wrapped keys generally take both public and private portions of wrapped keys and encrypt them. A new public portion is added to the key including data utilized by a vTPM module, or other vTPM software, to identify the type of key a virtual machine expects the vTPM key to be, a logical parent of the vTPM key even if the actual hTPM parent is different, and a public key.

FIG. 1 is an architectural diagram of a system 100 according to an example embodiment. The Virtual TPM ("vTPM") architecture is composed of several functional components, including vTPMs 106A, 106B, 106C and a vTPM manager 108 that communicates with a TPM 118 via a TPM driver 112. In some embodiments, the TPM 118 is a hardware TPM. The logical collection of a vTPM 106A, 106B, 106C and its respective operating system VM 104A, 104B, 104C create respective virtual platforms 102A, 102B, 102C. Although three VMs are illustrated, fewer or more VMs may be included in various embodiments. The vTPM manager 108 is composed of a vTPM manager module 110, a vTPM protected storage service 116, and a vTPM Factory 114. These components are isolated from the rest of the system 100. This isolation is accomplished in some embodiments by placing them in a VMM, one or more VMs, firmware, or any other similar protected facility which may include partitioned processors or processor cores and partitioned memory.

The vTPM 106A, 106B, 106C provides the actual TPM functionality to the VMs. In some embodiments, by providing all TPM functionality in the vTPM 106A, 106B, 106C, the design of the framework follows the principle of least common mechanism while also maximizing the flexibility of the vTPM 106A, 106B, 106C implementation to balance performance and security. Some embodiments may enjoy faster encryption operations or enhanced migration by implementing keys in software within the vTPM 106A, 106B, 106C, while other embodiments may require that all keys always reside in the TPM and that the vTPM 106A, 106B, 106C act as a portal to them. Additionally, this approach transparently allows the use of different vTPMs 106A, 106B, 106C to match the data protection and cryptography laws of different geographies or different data protection requirements of applications operable within various virtual machines ("VMs") 102A, 102B, 102C.

Each VM 102A, 102B, 102C has one vTPM 106A, 106B, 106C associated with it. In doing so, a simple system using the vTPM architecture may chose to implement a single vTPM design that reinstantiates for each VM 106A, 106B, 106C. In other embodiments, more flexible systems may allow for the VM configuration to dictate different vTPM implementations for different VMs.

In typical embodiments, the vTPM manager 108 is in charge of operational management of the vTPMs 106A, 106B, 106C. Such management may include creation, deletion, startup, and shutdown of vTPMs 106A, 106B, 106C. In some implementations the vTPM manager 108 may also be in charge of acquiring measurements of the vTPMs 106A, 106B, 106C for use by the vTPM factory 114 and vTPM protected storage service 116, such as in creating PCR bindings for vTPM keys.

Additionally the vTPM manager 108 is in charge of managing TPM 118 resources to allow the resources to be safely shared between vTPMs 106A, 106B, 106C. The primary TPM 118 resources under management are the set of key slots and authorization sessions. While providing access to the TPM 118, the manager 108 provides filtering of vTPM 106A, 106B, 106C requests for TPM 118 commands that impact the manager 108 or other vTPMs 106A, 106B, 106C. For example, a vTPM 106A, 106B, 106C typically should not be able to exercise the TPM_ClearOwner or evict keys owned by other vTPMs 106A, 106B, 106C.

To maintain the flexibility desired in the vTPMs 106A, 106B, 106C, one requirement that may be imposed on an implementation of the vTPMs 106A, 106B, 106C is that all persistent data that would be stored in the TPM's 118 protected, non-volatile memory are sent to the vTPM Protected Storage Service 116 for storage and protection while the vTPM 106A, 106B, 106C is not operational. In other embodiments, a VM may be tasked with storing vTPM keys. In such embodiments, the vTPM protected storage service 116 may authenticate the vTPMs 106A, 106B, 106C to ensure that the vTPM 106A, 106B, 106C attempting to load an offline state is the same as the one that saved it previously. This is performed in such embodiments to prevent tampering of the vTPM state on disk or other storage. Additionally, some embodiments, may provide many vTPM 106A, 106B, 106C implementations that are only able to load their own states.

In protecting the vTPM 106A, 106B, 106C persistent or offline state, the vTPM protected storage service 116 may use the authentication and protection mechanisms of the underlying TPM 118. Such authentication typically starts with the vTPM 106A, 106B, 106C framework and the Trusted Computing Base ("TCB"), whose hashes are typically stored in the TPM's 118 PCRs. A TPM 118 key, referred to as the offline storage key, may be used to encrypt the vTPM's 106A, 106B, 106C offline state. The offline storage key may be bound to the PCRs of the vTPM framework and the TCB. By using this PCR protected key to encrypt the vTPM's 106A, 106B, 106C offline state, the TPM 118 will refuse the release of secrets to an environment with a tampered or untrusted vTPM 106A, 106B, 106C framework or TCB.

A table of hashes of known encrypted states and their corresponding vTPM 106A, 106B, 106C measurements are typically maintained by the vTPM protected storage service 116 to allow the vTPM protected storage service 116 to authenticate the vTPM 106A, 106B, 106C that is trying to load an offline state. This table is then sealed and a monotonic counter is used for replay protection.

The vTPM factory 114 instantiates new vTPMs 106A, 106B, 106C. One aspect to this is the creation of virtual Endorsement Keys ("vEK"). The vTPM factory 114 may either generate the vEK or "squirt" it into the vTPM 106A, 106B, 106C after receiving it from an external source, similar to that of a TPM 118. When a new vEK is generated, the vTPM factory 116 that generated it facilitates the creation of endorsement and platform credentials for that vTPM 106A, 106B, 106C.

Each vTPM factory 116 is associated with a vTPM implementation and set of security properties, which dictates how software changes or migrations affect the vTPM 106A, 106B, 106C. A TPM 118 signing key and an identity key then represent claims made by that factory. The vTPM factories 116 also serve as the representatives for the vTPM architecture of the system 100 externally.

The vTPM factory 116 may function in one of two ways. First, the vTPM factory 116 can have a vTPM signing key, which is registered with a certificate authority ("CA"), that identifies it as a manufacturer of vTPMs of a given security profile. During the registration of the of the vTPM factory's 116 key, the CA makes a judgment about how well suited the platform is for hosting a vTPM manufacturing facility. If approved, this key is then used to sign vTPM credentials that it creates.

The second approach is for the vTPM factory 116 to use a TPM 118 signing or identity key to create evidence about the vTPM 106A, 106B, 106C and underlying platform to a certificate authority, which will use the evidence to create a credential for the vTPM 106A, 106B, 106C. If the vEK is squirted, an external CA must be used, since the platform cannot produce evidence to the confidentiality or integrity of the vEK before arriving at the vTPM factory 116. The CA would need to have a predefined relationship with the entity that generated of the vEK.

Figure 2:
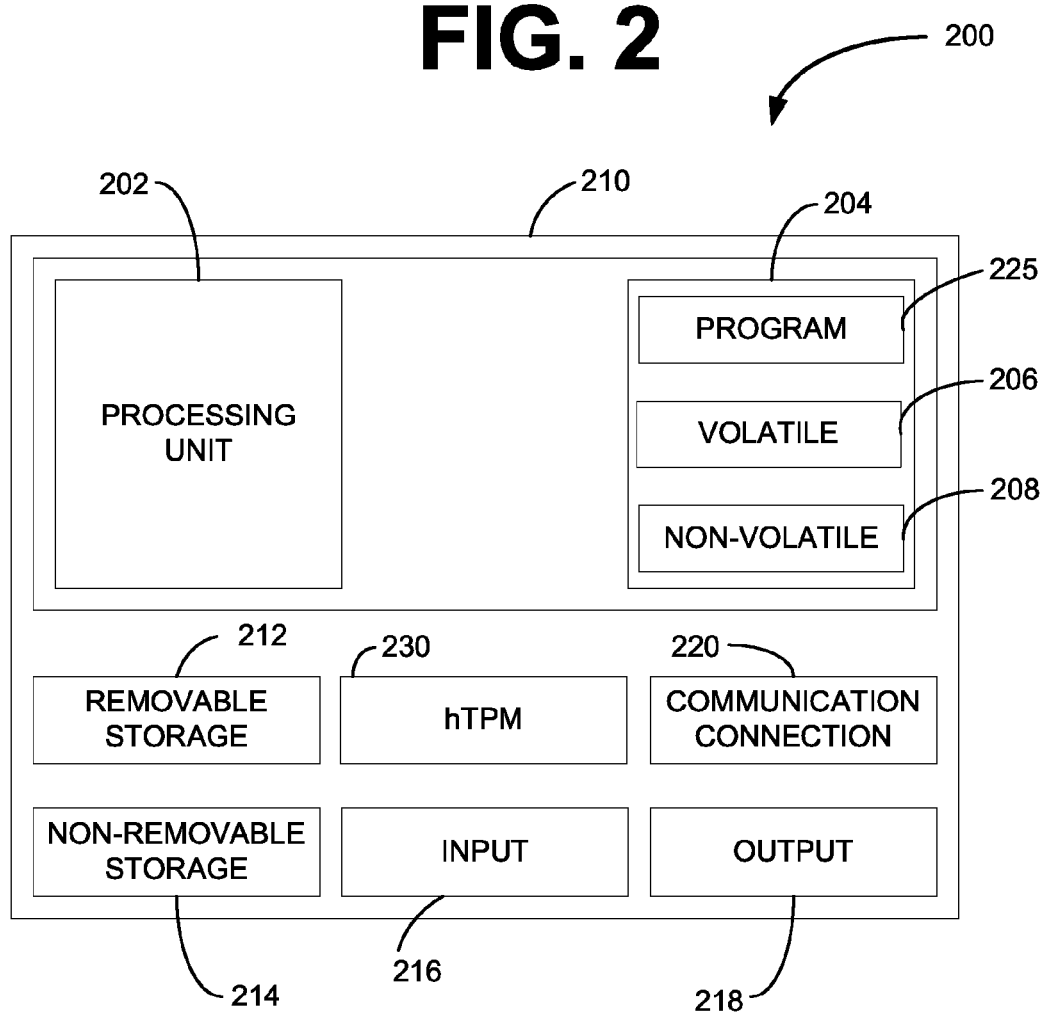
FIG. 2 is a block diagram of a computing device according to an example embodiment.

FIG. 2 is a block diagram of a computing device 200 according to an example embodiment. The computing device 200 is an example of a device upon which the system 100 of FIG. 1 may be implemented. One example computing device 200 is in the form of a computer 210 and may include one or more processing units 202, one or more memories 204, a hardware TPM 230, removable storage 212, and non-removable storage 214. The one or more processing units may be multi-core processing units which may be partitioned, such as to partition a processor core or a processor for each of multiple VMs. Memory 204 may include volatile memory 206 and non-volatile memory 208. In some embodiments, the volatile memory 206 may be partitioned to secure portions of memory for various purposes such as providing secure memory for storage of vTPM keys. The one or more processing units 202, one or more memories 204, and other components of the computer 210 may be interconnected in any number of various ways, such as via a bus, point to point interconnects, and by other suitable means. Computer 210 may include—or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 210 may include or have access to a computing environment that includes input 216, output 218, and a communication connection 220. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 202 of the computer 210. A hard drive, CD-ROM, and RAM are some examples of articles including a computer-readable medium. For example, a computer program 225 capable of providing some or all of the vTPM functionality may be included in the computer readable instructions.

Figure 3:
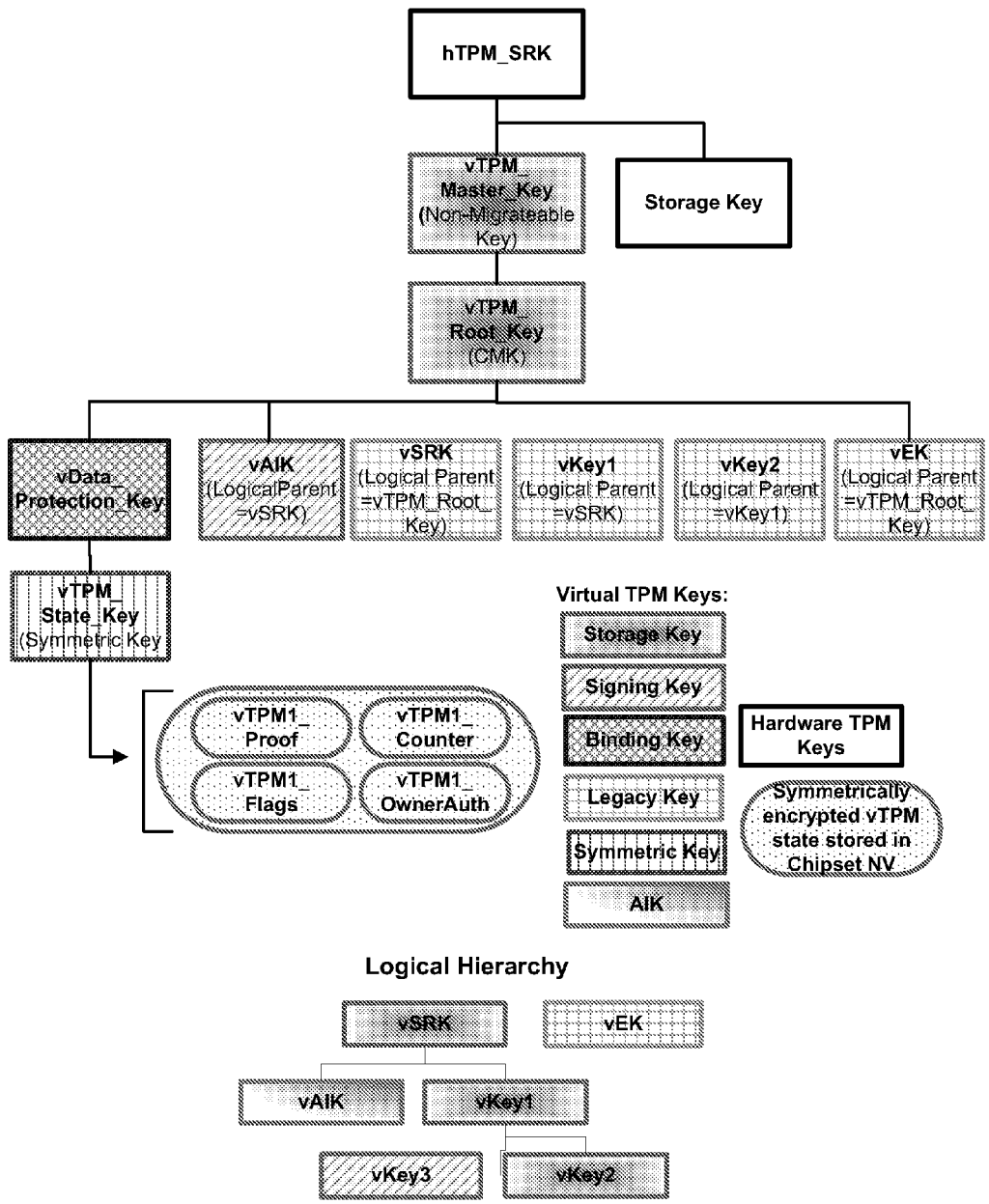
FIG. 3 illustrates a physical and logical organization of TPM keys according to an example embodiment.

FIG. 3 illustrates a physical and logical organization of TPM keys according to an example embodiment. The physical organization includes a hTPM_SRK at the top of the hierarchy followed by a vTPM_Master_Key. A vTPM_Root_Key exists in the hierarchy for each vTPM instances. Both the vTPM_Master_Key and vTPM_Root_Key are created as storage type TPM keys.

Under the vTPM_Root_Key of a vTPM, the other keys of the vTPM are created as children. Although the typical hierarchy of keys for a TPM is different, as illustrated in the logical hierarchy at the bottom of FIG. 3, the hierarchy of vTPM is relatively flat. This is caused by the use of legacy keys in the place of other keys types. The legacy keys are used to provide greater flexibility in virtualizing the keys. However, requesters of TPM keys expect the keys to be of a certain type. To solve this issue, the keys are double wrapped in the vTPM module to provide a public portion that looks to requesters as it should. However, the vTPM module is able to unwrap the double wrapped keys to get back to the original form of the keys and perform needed operations against the hTPM as necessary. The second wrap of the double wrapped vTPM keys includes a pointer to a logical parent of the key as expected by the requester. The logical hierarchy represents the relationship as identified by the pointers. However, the remainder of FIG. 3 illustrates the actual physical relationship of the keys.

Figure 4:
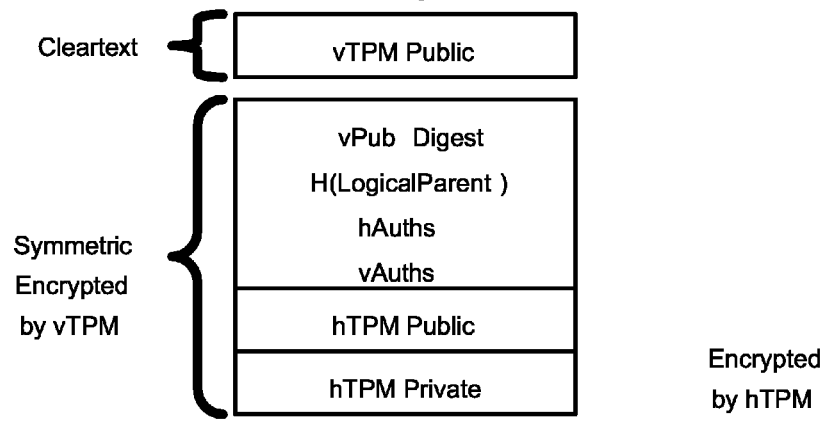
FIG. 4 is a logical diagram of a vTPM key.

FIG. 4 is a logical diagram of a vTPM key. The diagram of FIG. 4 illustrates an example of a logical structure of a "double-wrapped" vTPM key. The hTPM key structure is preserved within the private portion of the vTPM key structure. This structure, along with the use of TPM Legacy keys ensures that migration can be performed between other virtual and non-virtual TPMs. The use of legacy keys helps ensure that no formatting needs to be applied to the "double wrapped" keys.

As illustrated in FIG. 4, it can be seen how both the hTPM public and private portions are encrypted along with other data to create a private portion. Because a requester of a TPM key does not access the private portion, the increased size and additional data does not affect use of the vTPM key by the requester. The requester only looks to the public portion of the vTPM key. Thus, as far as the requester is aware, the vTPM key is just a TPM key as if the vTPM key originated with a hTPM. The private portion of the vTPM may be decrypted by processes of a vTPM module alone or through calls to the hTPM depending on the particular embodiment. Data is added to such a vTPM key to identify a logical parent of the key as discussed above with regard to FIG. 3. In some such embodiments, and others, the public portion of a vTPM key includes virtual platform configuration register bindings to the computing environment of the VM, a public key of the instantiated key, and an identifier of the root key as a logical parent key. Some embodiments may omit portions of the hTPM public as an optimization and reconstruct the hTPM public portions at load-time.

Figure 5:
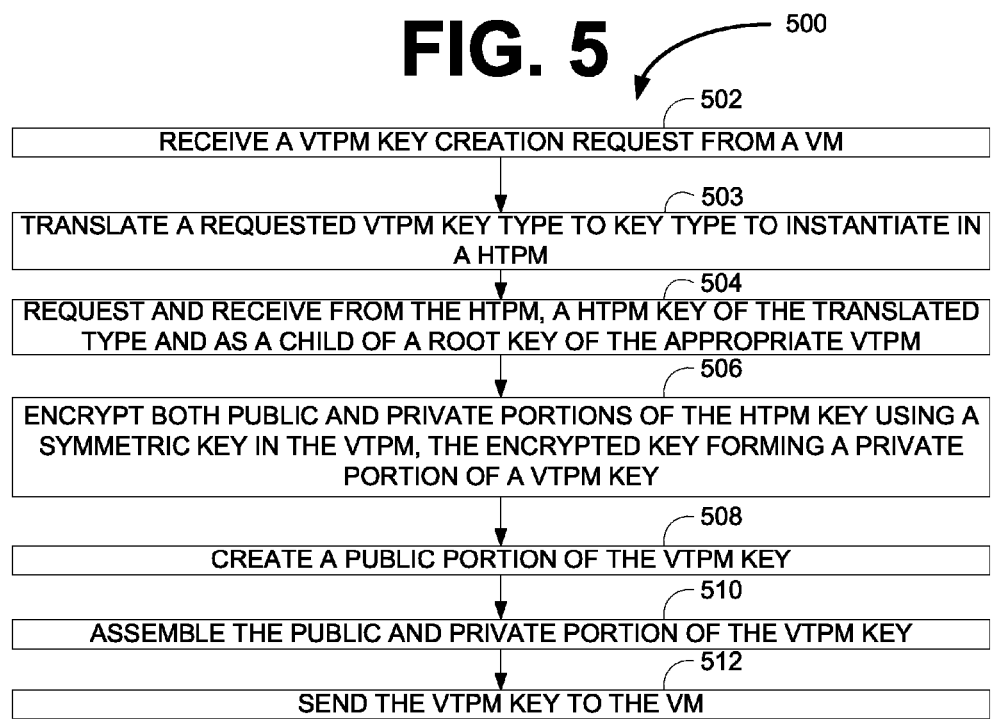
FIG. 5 is a block diagram of a method according to an example embodiment.

FIG. 5 is a block diagram of a method 500 according to an example embodiment. The method 500 includes receiving a vTPM key creation request from a virtual machine VM 502 including information identifying the key type of the request. The vTPM may translate a requested vTPM key type to key type to instantiate in the hTPM 503, and request and receive from the hTPM, a hTPM key of the translated type and as a child of a root key of the appropriate vTPM 504. The method 500 further includes encrypting both public and private portions of the hTPM key using a symmetric key in the vTPM, the encrypted key forming a private portion of a vTPM key 506 and creating a public portion of the vTPM key 508. The method then assembles the public and private portion of the vTPM key 510 and sends the vTPM key to the VM 512.

In some such embodiments, translating the type of vTPM key requested to a type to instantiate the vTPM key as in the hTPM includes selecting a type of TPM key from a mapping of vTPM key types to hTPM key types as a function of the type of vTPM key requested. This mapping may be a table identifying a type of key requested for a vTPM in rows of one column corresponding to rows in another column identifying a type of key to instantiate in the hTPM. This mapping may include a row for the endorsement key. While the endorsement key is not returned to the VM or double wrapped, it may require a mapping to an appropriate type. Such a mapping may include a mapping instructing a vTPM module to instantiate:

- a signing key when an attestation identity key ("AIK") key or a signing key is requested;
- a legacy key when a storage key is requested;
- a binding key when a binding key is requested;
- a legacy key when a legacy key is requested; and
- a legacy key for the endorsement key during TPM initialization.

Some embodiments of the method 500 may also include receiving, from a requesting VM, a decrypt request with a payload to decrypt that was encrypted according to a public key in the public portion of a requested vTPM key. The method 500 in such embodiments includes decrypting the vTPM key to obtain the key instantiated by the hTPM and sending the payload to decrypt and the hTPM key to the hTPM. The decrypted payload may then be received back from the hTPM which is then forwarded to the requesting VM.

In some embodiments, when migrating keys out of a vTPM, the migration may occur by converting a vTPM double wrapped key into a migration blob as specified by the TCG. Such a TCG standardized migration blob can be interpreted by any TCG compliant TPM, virtual or otherwise. To accomplish such an outbound migration, some vTPM embodiments include generating a temporary software key including both public and private portions. The hTPM them migrates the key to be migrated, or target key, to the temporary software key, allowing the vTPM to decrypt the private portion of the target key and the ability to reformat the target key for migration. An example of such a method to migrate a key out of a vTPM is illustrated in and described with regard to FIG. 6.

FIG. 6 is a block diagram of a method 600 according to an example embodiment. The method 600 is an example of how a key may be migrated out of a vTPM in one example embodiment. The method 600 includes receiving 602 a key migration request in a Virtual Trusted Platform Module ("vTPM") including an identifier of a key to migrate and a public key of a parent key of a target Trusted Platform Module ("TPM"). The request is signed via a key-Hashed Message Authentication Code (HMAC) using the migration authentication value of the key to migrate. The method 600 further includes creating 604 a temporary migration key without regard to a Hardware Trusted Platform Module ("hTPM"). The temporary migration key may include public and private portions and appear as if it were a TPM key.

The method 600 then includes sending 606 a key migration request with at least a public portion of the temporary migration key to a hTPM having been signed using migration authentication value. The hTPM, having validated the signature may then create a first migration blob and encrypt it according to the temporary migration key. (Note: The migration blob is designated as the "first" migration blob for clarity purposes when describing the several migration blobs of the method 600). The hTPM does not typically care where a key is migrated to so long as a proper migration authentication is provided. The vTPM then receives 608 the first migration blob from the hTPM including the private portion of the hTPM key encrypted using the public portion of the temporary migration key. The vTPM may then decrypt 610 the first migration blob using the temporary migration key to obtain clear text.

The method 600 further includes replacing 614 at least part of the private portion of the hTPM key in the clear text with at least part of a vTPM key private portion. A second migration blob may then be built 616 as a function of the clear text and the method 600 then encrypts the second migration blob with the public key of the target parent key in the target TPM. The second migration blob may then be sent 618 to the target TPM, either a hardware or virtual TPM, the key is to be migrated to.

In some embodiments of the method 600, the replacing 614 of at least part of the private portion of the hTPM key in the clear text with at least part of the vTPM key private portion includes replacing 614 a migration authentication value, a usage authentication value, and a public data digest portion of the hTPM clear text with corresponding portions of the vTPM key private portion.

In some embodiments of the method 600, both the vTPM receiving 602 the key migration request and the target TPM are vTPMs. In some such embodiments, both of the vTPMs are operable within virtual machines on a single physical computer or other computing device. While in other embodiments, the vTPMs are operable within virtual machines on separate physical computers or other computing devices.

When receiving an inbound TPM key, the various embodiments herein leverage the fact that all virtual Storage key are stored in the TPM as Legacy keys. Recalling the description of Legacy keys above, Legacy keys may be used to decrypt and encrypt unformatted data using a TPM_Unbind instruction. This use of Legacy keys allows a vTPM access to the private portion of an incoming key that is encrypted with the Legacy keys public key. The vTPM can then adjust attributes of the key, such as PCR bindings before inserting the inbound key into a hTPM. FIG. 7 is an example embodiment of such an inbound key migration method.

FIG. 7 is a block diagram of a method 700 according to an example embodiment. The method 700 includes receiving 702 an inbound key migration request, typically in the form of a TCG standardized key migration blob. The method 700 may then translate 704 a requested key type of the key migration request to a key type to instantiate in a hTPM. The method 700 then decrypts 706 the migration blob and generates a new blob based on the translation. The vTPM may then request 708 and receive from the hTPM, a converted key of the translated type and as a child of a root key of the appropriate vTPM. The vTPM then encrypts 710 both public and private portions of the hTPM key using a symmetric key. The encrypted key forms the private portion of the new vTPM key. The method 700 further includes creating 712 a public portion of the vTPM key, as described above with regard to portion 508 of method 500 with regard to FIG. 5. The public and private portions of the vTPM key are then assembled 714 and the vTPM key is sent 716 to the VM of the vTPM.

Another inbound key migration method embodiment includes receiving a first migration blob by a vTPM of a Virtual Machine VM from a source TPM. The first migration blob is typically encrypted by the source TPM using a public key associated to a private key the vTPM has available. Such an embodiment further includes decrypting the first migration blob using a legacy key, translating a type of the key to migrate from a first key type to a second key type, and generating a new private portion for the legacy key as a function of the vTPM and a VMM upon which the VM operates. The method of this embodiment then replaces the private portion of the legacy key with the new private portion and creates a second migration blob as a function of the legacy key, the translated second key type, and a public key of an appropriate hTPM parent of a key to be created in a hTPM. The second migration blob may then be sent to the hTPM.

The method in some such embodiments may further include receiving from the hTPM, a migrated hTPM key of the translated second key type as a child of a hTPM key corresponding to a root key of the vTPM. Both public and private portions of the migrated hTPM key are then encrypted using a key of the vTPM to form a private key portion. The public key portion may then be created and assembled with the private portion to generate a new vTPM key, which is then sent to the VM. The created public key portion typically includes virtual platform configuration register bindings to the computing environment of the VM, a public key of the migrated key, and an identifier of the root key as a logical parent key. The assembled public and private portion of the new vTPM key form a double wrapped vTPM key as described above and illustrated in FIG. 4.

The translating of the type of the key to migrate from the first key type to the second key type may include selecting a TPM key type from a mapping of vTPM key types to hTPM key types as a function of the first key type. Such a mapping may instruct such method embodiments to instantiate:

a hTPM signing key when the first key type is an attestation key ("AIK") or signing key;
a legacy key when the first key type is a storage key;
a legacy key when the first key type is an endorsement key;
a binding key when the first key type is a binding key; and
a legacy key when the first key type is a legacy key.

In embodiments of this method, and the method 700, the source TPM may be either a hTPM or a vTPM. In some embodiments, both the source TPM and the receiving TPM are vTPMs. In some such embodiments, the vTPMs are both on the same physical computer or other computing device.

The described methods of migrating TPM keys into and out of vTPMs may be performed by the same vTPM. However, embodiments are possible where a vTPM may not be allowed to migrate keys in or, conversely, migrate keys out. Such migration limits may be placed on certain vTPM embodiments for any number of reasons.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving a key migration request including an identifier of a key to migrate, a public key of a parent key of a target Trusted Platform Module ("TPM"), and a migration authority of the key to migrate;
   creating a temporary migration key without regard to a Hardware Trusted Platform Module ("hTPM");
   sending a key migration request, the migration authority, and a public portion of the temporary migration key to a hTPM;
   receiving a first migration blob from the hTPM including a private portion of a hTPM key encrypted using the public portion of the temporary migration key;
   decrypting the first migration blob using the temporary migration key to obtain clear text;
   replacing at least part of the private portion of the hTPM key in the clear text with at least part of a Virtual Trusted Platform Module ("vTPM") key private portion; and
   building a second migration blob as a function of the clear text and encrypting the second migration blob with the public key of the parent key of the target TPM.

2. The method of claim 1, wherein the at least part of the private portion of the hTPM key in the clear text replaced with at least part of the vTPM key private portion includes replacing a migration authority, a use authority, and a public data digest portion of the hTPM clear text with corresponding portions of the vTPM key private portion.

3. The method of claim 1, wherein the target TPM is a hTPM.

4. The method of claim 1, wherein the key migration request is received by a vTPM and the target TPM is a vTPM.

5. The method of claim 4, wherein both vTPM's are within virtual machines on a single physical computer.

6. A method comprising 1, further comprising:
   sending the second migration blob to the target TPM.

7. A non-transitory computer-readable medium with instructions thereon, which when processed cause a suitable computing device to perform the method of claim 1.

8. A method comprising:
   receiving a first migration blob by a Virtual Trusted Platform Module ("vTPM") of a Virtual Machine ("VM") from a source Trusted Platform Module ("TPM"), the first migration blob encrypted by the source TPM using a public key associated to a private key the vTPM has available;
   decrypting the first migration blob using a legacy key;

translating a type of the key to migrate from a first key type to a second key type;

generating a new private portion for the legacy key as a function of the vTPM and a Virtual Machine Manager ("VMM") upon which the VM operates;

replacing the private portion of the legacy key with the new private portion for the legacy key;

creating a second migration blob as a function of the legacy key, the translated second key type, and a public key of an appropriate hTPM parent of a key to be created in a Hardware Trusted Platform Module ("hTPM"); and sending the second migration blob to the hTPM.

9. The method of claim 8, further comprising:

receiving from the hTPM, a migrated hTPM key of the translated second key type as a child of a hTPM key corresponding to a root key of the vTPM;

encrypting both public and private portions of the migrated hTPM key, using a key of the vTPM, to form a private key portion;

creating a public key portion;

assembling the public and private key portions to generate a new vTPM key; and sending the new vTPM key to the VM.

10. The method of claim 9, wherein the created public key portion includes virtual platform configuration register bindings to a computing environment of the VM, a public key of the migrated key, and an identifier of the root key as a logical parent key.

11. The method of claim 8, wherein translating the type of the key to migrate from the first key type to the second key type includes selecting a TPM key type from a mapping of vTPM key types to hTPM key types as a function of the first key type.

12. The method of claim 11, wherein the mapping of vTPM key types to hTPM key types instructs the method to instantiate:

a hTPM signing key when the first key type is an attestation key ("AIK") or signing key;

a legacy key when the first key type is a storage key;

a legacy key when the first key type is an endorsement key;

a binding key when the first key type is a binding key; and a legacy key when the first key type is a legacy key.

13. The method of claim 8, wherein the source TPM is a hTPM.

14. The method of claim 8, wherein the source TPM and the vTPM are both vTPMs on the same physical computing device.

15. A non-transitory computer-readable medium with instructions thereon, which when processed cause a suitable computing device to perform the method of claim 8.

16. A system comprising:

a hardware trusted platform module ("hTPM");

one or more processing cores in one or more microprocessors;

a software layer to partition the system into distinct execution environments in one or more of the processing cores;

one or more virtual machines each operable in one or more of the processing cores; and a virtual trusted platform module ("vTPM") to communicate with the one or more virtual machines and the hTPM to provide virtualized access to the hTPM for the one or more virtual machines, the vTPM operable to migrate a TPM key into the vTPM by:

receiving a first migration blob from a source Trusted Platform Module ("TPM"), the first migration blob encrypted by the source TPM using a public key associated to a key of the vTPM;

decrypting the first migration blob using a legacy key;

translating a type of the key to migrate from a first key type to a second key type;

generating a new private portion for the legacy key as a function of the vTPM and the software layer;

replacing the private portion of the legacy key with the new private portion for the legacy key;

creating a second migration blob as a function of the legacy key, the translated second key type, and a public key of an appropriate hTPM parent of a key to be created in the hTPM;

sending the second migration blob to the hTPM;

receiving from the hTPM, a migrated hTPM key of the translated second key type as a child of a hTPM key corresponding to a root key of the vTPM;

encrypting both public and private portions of the migrated hTPM key, using the key of the vTPM, to form a private key portion;

creating a public key portion;

assembling the public and private key portions to generate a new vTPM key; and sending the new vTPM key to a virtual machine.

17. The system of claim 16, wherein the public key portion created by the vTPM includes VM platform configuration register bindings to a computing environment of the VM to which the vTPM is operable with, a public key of the migrated key, and an identifier of the root key as a logical parent key.

18. The system of claim 16, wherein the vTPM, when translating the type of the key to migrate from the first key type to the second key type, selects a TPM key type from a mapping of vTPM key types to hTPM key types as a function of the first key type.

19. The system of claim 16, wherein the vTPM is further operable to migrate a TPM key out of the vTPM by:

receipt of a key migration request including an identifier of a key to migrate, a public key of a parent key of a target TPM, and a migration authority of the key to migrate;

create a temporary migration key without regard to the hTPM;

send a key migration request, the migration authority, and a public portion of the temporary migration key to the hTPM;

receive a third migration blob from the hTPM including a private portion of a hTPM key encrypted using the public portion of the temporary migration key;

decrypt the third migration blob using the temporary migration key to obtain clear text;

replace at least part of the private portion of the hTPM key in the clear text with at least part of a vTPM key private portion; and build a fourth migration blob as a function of the clear text and encrypting the fourth migration blob with the public key of the parent key of the target TPM.

20. The system of claim 19, wherein the target TPM is a hTPM.

21. The system of claim 19, wherein the target TPM is another vTPM operable within the system.

22. The system of claim 19, wherein the vTPM, when migrating a key out of the vTPM, is further operable to send the fourth migration blob to the target TPM.

\* \* \* \* \*